United States Patent [19]

Lee

[11] Patent Number: 5,424,514

[45] Date of Patent: Jun. 13, 1995

[54] APPARATUS FOR SENSING SMALL OBJECT IN HIGH-FREQUENCY INDUCTION HEATING COOKER

[75] Inventor: Ki Y. Lee, Daeku, Rep. of Korea

[73] Assignee: Goldstar Electron Co., Ltd., Choongchungbook-Do, Rep. of Korea

[21] Appl. No.: 287,039

[22] Filed: Aug. 8, 1994

[30] Foreign Application Priority Data

Aug. 10, 1993 [KR] Rep. of Korea ............... 15506/1993

[51] Int. Cl.⁶ .................... H05B 6/08; H05B 6/12
[52] U.S. Cl. ..................... 219/626; 219/665
[58] Field of Search ............ 219/626, 627, 625, 665, 219/666, 667, 663

[56] References Cited

U.S. PATENT DOCUMENTS

| | | | |
|---|---|---|---|
| 4,456,807 | 6/1984 | Ogino et al. | 219/626 |
| 4,511,781 | 4/1985 | Tucker et al. | 219/626 |
| 4,600,823 | 7/1986 | Hiejima | 219/663 |
| 4,764,652 | 8/1988 | Lee | 219/627 |
| 4,810,847 | 3/1989 | Ito | 219/626 |
| 4,820,891 | 4/1989 | Tanaka et al. | 219/626 |
| 5,111,014 | 5/1992 | Tanaka et al. | 219/626 |

Primary Examiner—Philip H. Leung

Attorney, Agent, or Firm—Lowe, Price, LeBlanc & Becker

[57] ABSTRACT

An apparatus for sensing a small object in a high-frequency induction heating cooker, comprising a rectifying/smoothing circuit for rectifying and smoothing an AC voltage from a power source to convert it into a DC voltage, an inverter for converting the DC voltage into a high frequency of AC voltage, a heating coil for generating an induced current according to the AC voltage from the inverter, a synchronization detector for detecting a synchronization signal, a current detector for detecting an amount of current through the rectifying/smoothing circuit, a voltage detector for detecting a voltage from a desired position of the inverter, a small object sensing circuit for discriminating presence of the small object in a cooking container in response to output voltages from the current detector and the voltage detector, a clock generator for generating a clock signal for system synchronization, a pulse generator for generating a pulse signal in response to output signals from the clock generator and the small object sensing circuit, a reset circuit for outputting a reset signal, a NOR gate for NORing the pulse signal from the pulse generator and the reset signal, and a controller for controlling the inverter in response to the synchronization signal and an output signal from the NOR gate.

3 Claims, 3 Drawing Sheets

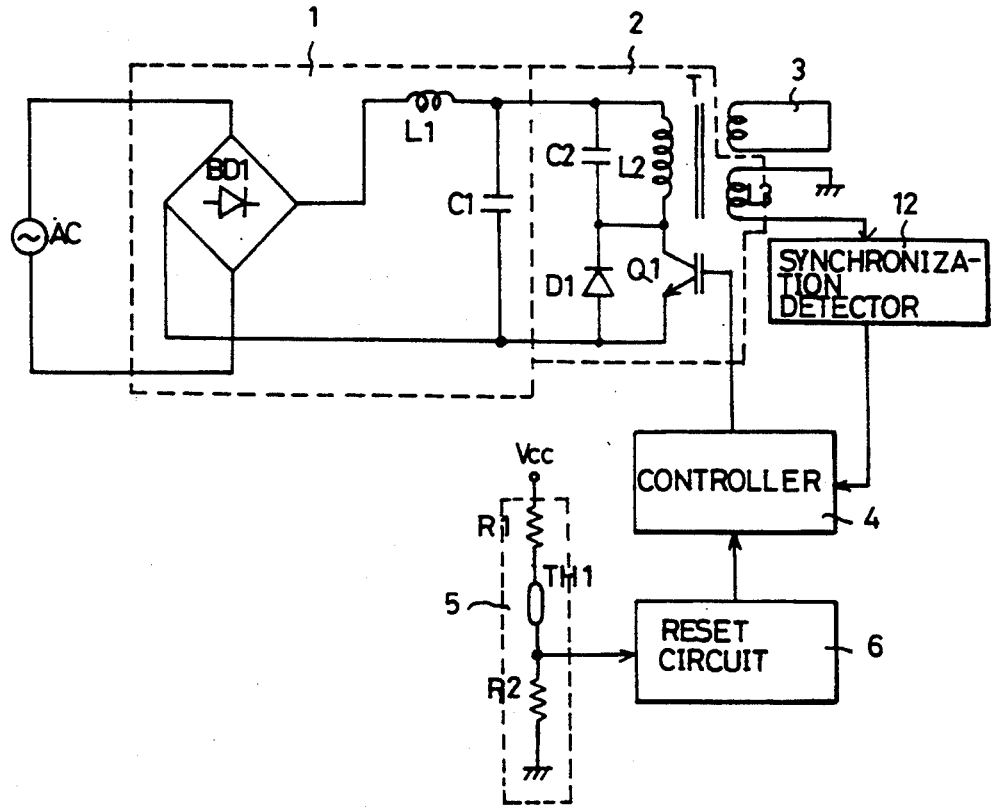
FIG. 1
CONVENTIONAL ART
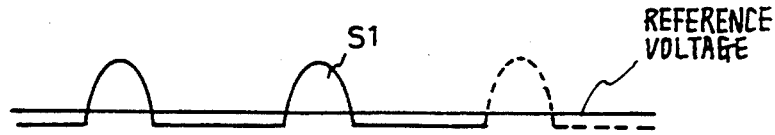
FIG.2A
CONVENTIONAL ART
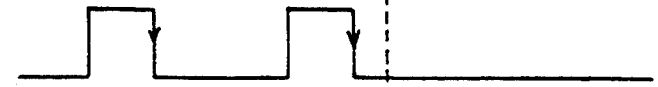
FIG.2B
CONVENTIONAL ART
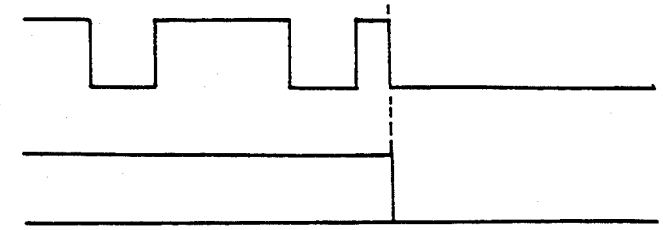
FIG.2C
CONVENTIONAL ART
FIG.2D
CONVENTIONAL ART

APPARATUS FOR SENSING SMALL OBJECT IN HIGH-FREQUENCY INDUCTION HEATING COOKER

BACKGROUND OF THE INVENTION

1. Field of the Invention

The present invention relates in general to an apparatus for sensing a small object in a high-frequency induction heating cooker, and more particularly to such an apparatus for sensing rapidly presence of the small object, such as a spoon, on a turntable of the high-frequency induction heating cooker.

2. Description of the Prior Art

Referring to FIG. 1, there is shown a circuit diagram of a conventional apparatus for sensing a small object in a high-frequency induction heating cooker. As shown in this drawing, the conventional small object sensing apparatus comprises a rectifying/smoothing circuit 1 for rectifying and smoothing an alternating current (AC) voltage from a power source to convert it into a direct current (DC) voltage and applying the converted DC voltage to an inverter 2.

The inverter 2 is adapted to convert the DC voltage from the rectifying/smoothing circuit 1 into a high frequency of AC voltage under control of a controller 4.

The conventional small object sensing apparatus also comprises a heating coil 3 for generating an induced current according to the AC voltage from the inverter 2 to heat a target object in a cooking container, a synchronization detector 12 for detecting a synchronization signal resulting from a resonance operation of the inverter 2 and outputting the detected synchronization signal to the controller 4, and a temperature detector 5 for detecting a temperature of the high-frequency induction heating cooker and outputting the resultant signal to a reset circuit 6.

The reset circuit 6 is adapted to reset the controller 4 in response to an output signal from the temperature detector 5 to stop the operation of the high-frequency induction heating cooker.

The controller 4 is adapted to control the inverter 2 in response to the synchronization signal from the synchronization detector 12 and a reset signal from the reset circuit 6.

The operation of the conventional small object sensing apparatus with the above-mentioned construction will hereinafter be described with reference to FIG. 1 and FIGS. 2A to 2D, in which FIG. 2A is a timing diagram of a voltage generated in a secondary coil L3 of a transformer T by the resonance operation of the inverter 2, FIG. 2B is a timing diagram of the synchronization signal from the synchronization detector 12, FIG. 2C is a timing diagram of a control signal from the controller 4 and FIG. 2D is a timing diagram of the output signal from the temperature detector 5.

First, the AC voltage from the power source is supplied to the rectifying/smoothing circuit 1. In the rectifying/smoothing circuit 1, the supplied AC voltage is full wave-rectified by a bridge diode BD1 and then charged on a capacitor C1. At this time, a ripple effect appears as the charging and discharging of the capacitor C1 are repeatedly performed. Such a ripple effect is removed by a choke coil L1 which connected between an output terminal of the bridge diode BD1 and a positive terminal of the capacitor C1. As a result, the smoothed DC voltage is outputted from the rectifying/smoothing circuit 1.

The smoothed DC voltage from the rectifying/smoothing circuit 1 is applied to the inverter 2. In the inverter 2, the smoothed DC voltage from the rectifying/smoothing circuit 1 is applied to a primary coil L2 of the transformer T and, thus, the AC voltage of the high frequency is induced in the secondary coil L3 of the transformer T according to a switching operation of a switching device Q1 under the control of the controller 4. The induced AC voltage in the secondary coil L3 of the transformer T results in the generation of the induced current in the heating coil 3. As a result, the target object in the cooking container is heated based on the induced current of the heating coil 3.

Namely, the induced voltage as shown by the reference numeral S1 in FIG. 2A is generated in the secondary coil L3 of the transformer T by the resonance operation of a capacitor C2 and the primary coil L2 of the transformer T in the inverter 2. Then, the synchronization detector 12 detects the synchronization signal as shown in FIG. 2B by detecting a zero crossing point of the voltage S1 induced in the secondary coil L3 of the transformer T. The detected synchronization signal from the synchronization detector 12 is applied to the controller 4. The controller 4 outputs the control signal as shown in FIG. 2C to the switching device Q1 in response to the synchronization signal from the synchronization detector 12. As shown in FIG. 2C, the control signal from the controller 4 goes high at a falling edge of the synchronization signal from the synchronization detector 12, whereas low at a rising edge of the synchronization signal from the synchronization detector 12. The switching device Q1 is turned on in response to the high control signal from the controller 4. After the lapse of a predetermined time period, the switching device Q1 is turned off in response to the low control signal from the controller 4. Also in the inverter 2, a diode D1 functions to protect the switching device Q1 against an overvoltage.

On the other hand, as the cooking operation of the high-frequency induction heating cooker is advanced, temperatures of the bridge diode BD1 and the switching device Q1 are increased, resulting in an increase in a resistance of a thermistor TH1 in the temperature detector 5. In the temperature detector 5, a reference voltage Vcc appears mostly at a resistor R1 and the thermistor TH1, whereas little at a resistor R2, with the increase in the resistance of the thermistor TH1. As a result, the output signal from the temperature detector 5 is changed from a high level to a low level as shown in FIG. 2D. The output signal from the temperature detector 5 as shown in FIG. 2D is applied to the reset circuit 6, which thus outputs the reset signal to the controller 4.

Assuming that the small object such as a spoon or a metallic bit is placed on a turntable of the high-frequency induction heating cooker, a small amount of current flows through the switching device Q1 and a high voltage is generated therein, resulting in an abrupt increase in the temperature. The abrupt increase in the temperature of the switching device Q1 increases the resistance of the thermistor TH1 in the temperature detector 5, thereby causing the temperature detector 5 to output the low signal to the reset circuit 6, as mentioned above. As a result, the high-frequency induction heating cooker is reset in response to the reset signal from the reset circuit 6.

However, the above-mentioned conventional small object sensing apparatus has a disadvantage in that it takes the system temperature much time to rise to a predetermined value for the sensing of the small object, because the small object is sensed on the basis of the increase in the temperatures of the bridge diode and the switching device. Also, it takes the system much time to be restored to a normal state after the small object is removed, since the system is released from the reset state only when the system temperature falls below the predetermined value.

SUMMARY OF THE INVENTION

Therefore, the present invention has been made in view of the above problem, and it is an object of the present invention to provide an apparatus for sensing a small object in a high-frequency induction heating cooker in which presence of the small object in a cooking container is rapidly sensed and the high-frequency induction heating cooker is rapidly restored to a normal state after the small object is removed.

In accordance with the present invention, the above and other objects can be accomplished by a provision of an apparatus for sensing a small object in a high-frequency induction heating cooker, comprising rectifying/smoothing means for rectifying and smoothing an AC voltage from a power source to convert it into a DC voltage; inverter means for converting the DC voltage from said rectifying/smoothing means into a high frequency of AC-voltage; heating means for generating an induced current according to the AC voltage from said inverter means to heat a target object in a cooking container; synchronization detection means for detecting a synchronization signal resulting from a resonance operation of said inverter means; current detection means for detecting an amount of current flowing through said rectifying/smoothing means and outputting a voltage based on the detected current amount; voltage detection means for detecting a voltage from a desired position of said inverter means; small object sensing means for discriminating presence of the small object in the cooking container in response to output voltages from said current detection means and said voltage detection means; clock generation means for generating a clock signal for system synchronization; pulse generation means for generating a pulse signal in response to output signals from said clock generation means and said small object sensing means; reset means for outputting a reset signal to reset the operation of the high-frequency induction heating cooker; a NOR gate for NORing the pulse signal from said pulse generation means and the reset signal from said reset means; and control means for controlling said inverter means in response to the synchronization signal from said synchronization detection means and an output signal from said NOR gate.

BRIEF DESCRIPTION OF THE DRAWINGS

The above and other objects, features and advantages of the present invention will be more clearly understood from the following detailed description taken in conjunction with the accompanying drawings, in which:

FIG. 1 is a circuit diagram of a conventional apparatus for sensing a small object in a high-frequency induction heating cooker;

FIGS. 2A to 2D are timing diagrams of signals from components in FIG. 1;

DETAILED DESCRIPTION OF THE PREFERRED EMBODIMENT

Figure 3:
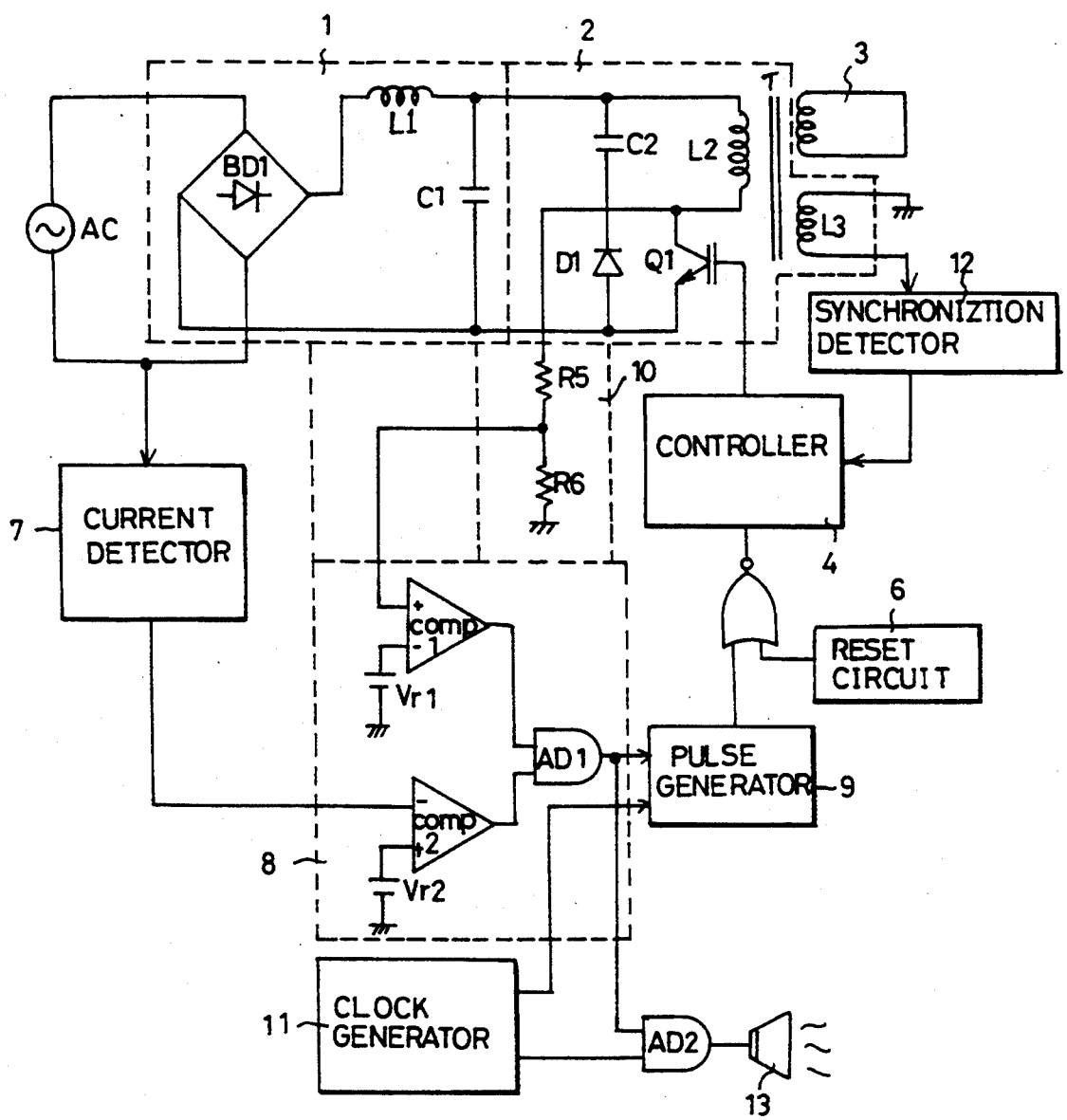
FIG. 3 is a circuit diagram of an apparatus for sensing the small object in the high-frequency induction heating cooker in accordance with the present invention.

Referring to FIG. 3, there is shown a circuit diagram of an apparatus for sensing a small object in a high-frequency induction heating cooker in accordance with the present invention. Some of parts in this drawing are the same as those in FIG. 1. Therefore, like reference numerals designate like parts.

As shown in FIG. 3, the rectifying/smoothing circuit 1 is adapted to rectify and smooth the AC voltage from the power source to convert it into the DC voltage and applies the converted DC voltage to the inverter 2.

The inverter 2 is adapted to convert the DC voltage from the rectifying/smoothing circuit 1 into the AC voltage of the high frequency under the control of the controller 4.

The heating coil 3 is adapted to generate the induced current according to the AC voltage from the inverter 2 to heat the target object in the cooking container.

The synchronization detector 12 is adapted to detect the synchronization signal resulting from the resonance operation of the inverter 2 and output the detected synchronization signal to the controller 4.

Also, the small object sensing apparatus comprises a current detector 7 for detecting an amount of current flowing through the rectifying/smoothing circuit 1 and outputting a voltage based on the detected current amount to a small object sensing circuit 8, and a voltage detector 10 for detecting a voltage from a desired position of the inverter 2 and outputting the detected voltage to the small object sensing circuit 8.

The small object sensing circuit 8 is adapted to discriminate the presence of the small object in the cooking container in response to output voltages from the current detector 7 and the voltage detector 8.

The small object sensing apparatus also comprises a clock generator 11 for generating a clock signal for system synchronization, an AND gate AD2 for ANDing output signals from the clock generator 11 and the small object sensing circuit 8, a buzzer 13 being driven in response to an output signal from the AND gate AD2, a pulse generator 9 for generating a pulse signal in response to the output signals from the clock generator 11 and the small object sensing circuit 8, and a NOR gate NR1 for NORing the pulse signal from the pulse generator 9 and the reset signal from the reset circuit 6.

The reset circuit 6 is adapted to output the reset signal to the NOR gate NR1 to reset the operation of the high-frequency induction heating cooker.

The controller 4 is adapted to control the inverter 2 in response to the synchronization signal from the synchronization detector 12 and an output signal from the NOR gate NR1.

The small object sensing circuit 8 includes a first comparator COMP1 having a non-inverting input terminal for inputting the output voltage from the voltage detector 10 and an inverting input terminal for inputting a first reference voltage Vr1, a second comparator COMP2 having an inverting input terminal for inputting the output voltage from the current detector 7 and a non-inverting input terminal for inputting a second reference voltage Vr2, and an AND gate AD1 for ANDing output signals from the first and second comparators COMP1 and COMP2 and outputting the resultant signal to the pulse generator 9.

Figure 4A:
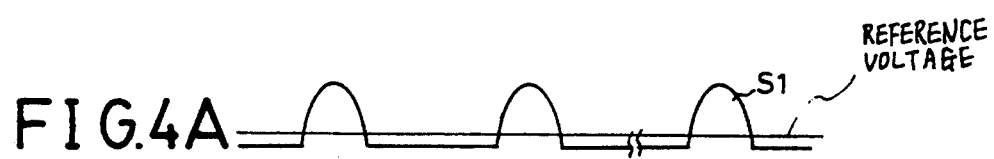
FIGS. 4A to 4J are timing diagrams of signals from components in FIG. 3.
Figure 4B:
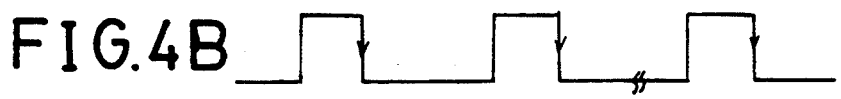
Figure 4C:
Figure 4D:
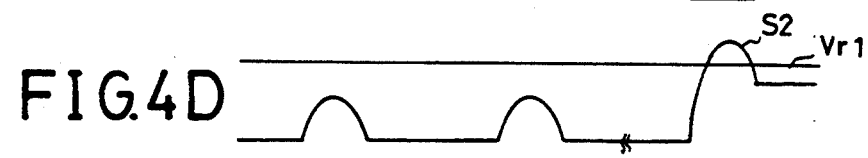
Figure 4E:
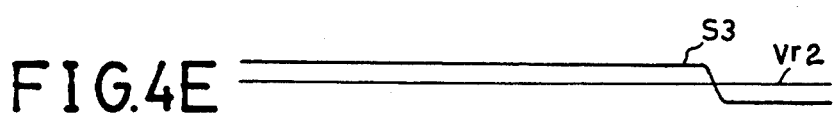
Figure 4F:
Figure 4G:
Figure 4H:
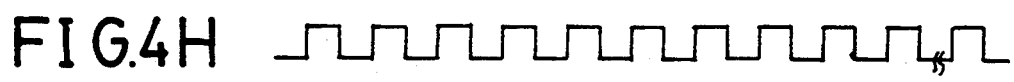
Figure 4I:
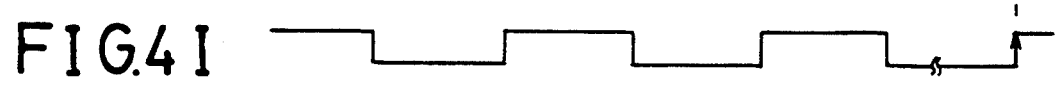
Figure 4J:

The operation of the small object sensing apparatus with the above-mentioned construction in accordance with the present invention will hereinafter be described in detail with reference to FIG. 3 and FIGS. 4A to 4J, in which FIG. 4A is a timing diagram of the voltage generated in the secondary coil L3 of the transformer T by the resonance operation of the inverter 2, FIG. 4B is a timing diagram of the synchronization signal from the synchronization detector 12, FIG. 4C is a timing diagram of the control signal from the controller 4, FIG. 4D is a timing diagram of the output voltage from the voltage detector 10 and the first reference voltage Vr1 which are inputted to the first comparator COMP1, FIG. 4E is a timing diagram of the output voltage from the current detector 7 and the second reference voltage Vr2 which are inputted to the second comparator COMP2, FIG. 4F is a timing diagram of the output signal from the small object sensing circuit 8, FIG. 4G is a timing diagram of the output signal from the pulse generator 9, FIG. 4H is a timing diagram of the output signal from the clock generator 11, FIG. 4I is a timing diagram of a signal obtained by frequency-dividing the output signal from the clock generator 11 by 2, and FIG. 4J is a timing diagram of the output signal from the AND gate AD2.

First, upon inputting the AC voltage from the power source, the rectifying/smoothing circuit 1 rectifies and smoothes the inputted AC voltage to convert it into the DC voltage and applies the converted DC voltage to the inverter 2. In the inverter 2, the smoothed DC voltage from the rectifying/smoothing circuit 1 is applied to the primary coil L2 of the transformer T and, thus, the AC voltage of the high frequency is induced in the secondary coil L3 of the transformer T according to the switching operation of the switching device Q1 under the control of the controller 4. The induced AC voltage in the secondary coil L3 of the transformer T results in the generation of the induced current in the heating coil 3. As a result, the target object in the cooking container is heated based on the induced current of the heating coil.

Namely, the induced voltage as shown by the reference numeral S1 in FIG. 4A is generated in the secondary coil L3 of the transformer T by the resonance operation of the capacitor C2 and the primary coil L2 of the transformer T in the inverter 2. Then, the synchronization detector 12 detects the synchronization signal as shown in FIG. 4B by detecting the zero crossing point of the voltage S1 induced in the secondary coil L3 of the transformer T. The detected synchronization signal from the synchronization detector 12 is applied to the controller 4. The controller 4 Outputs the control signal as shown in FIG. 4C to the switching device Q1 in response to the synchronization signal from the synchronization detector 12. As shown in FIG. 4C, the control signal from the controller 4 goes high at the falling edge of the synchronization signal from the synchronization detector 12, whereas low at the rising edge of the synchronization signal from the synchronization detector 12. The switching device Q1 is turned on in response to the high control signal from the controller 4, whereas off in response to the low control signal from the controller 4. In this manner, the switching device Q1 is repeatedly turned on/off under the control of the controller 4.

Assuming that the small object such as the spoon or the metallic bit is placed in the cooking container, current of an amount smaller than that in the absence of the metallic bit flows through the rectifying/smoothing circuit 1 and the voltage across the switching device Q1 rises. Then, the current detector 7 detects the smaller amount of current flowing through the rectifying/smoothing circuit 1 and outputs the corresponding voltage to the inverting input terminal of the second comparator COMP2 in the small object sensing circuit 8. At this time, the output voltage from the current detector 7 is lower than the second reference voltage Vr2 which is applied to the non-inverting input terminal of the second comparator COMP2.

The voltage detector 10 detects the rising voltage across the switching device Q1 and outputs the detected voltage to the non-inverting input terminal of the first comparator COMP1 in the small object sensing circuit 8, the inverting input terminal of which is applied with the first reference voltage Vr1.

In the small object sensing circuit 8, the first comparator COMP1 compares the output voltage S2 from the voltage detector 10 inputted at its non-inverting input terminal with the first reference voltage Vr1 inputted at its inverting input terminal, as shown in FIG. 4D. The second comparator COMP2 compares the output voltage S3 from the current detector 7 inputted at its inverting input terminal with the second reference voltage Vr2 inputted at its non-inverting input terminal, as shown in FIG. 4E.

Then, the AND gate AD1 ANDs the output signals from the first and second comparators COMP1 and COMP2 and provides its output signal as shown in FIG. 4F to the pulse generator 9. The pulse generator 9 outputs a high signal as shown in FIG. 4G to the NOR gate NR1 in response to the output signal from the AND gate AD1 in the small object sensing circuit 8 and the output signal from the clock generator 11 as shown in FIG. 4H. When at least one of the output signals from the pulse generator 9 and the reset circuit 6 is high in level, the output of the NOR gate NR1 is low in level. In this connection, the NOR gate NR1 outputs a low signal to the controller 4 because the output of the pulse generator 9 is high in level. As a result, the controller 4 resets the system in response to the low signal from the NOR gate NR1.

The AND gate AD2 ANDs the output signal from the AND gate AD1 in the small object sensing circuit 8 and the output signal from the clock generator 11 and provides its output signal as shown in FIG. 4J to the buzzer 13, thereby causing the buzzer 13 to be driven to inform the user of the presence of the small object.

On the other hand, upon removal of the small object by the user, in the small object sensing circuit 8, the voltage inputted to the non-inverting input terminal of the first comparator COMP1 becomes lower than the first reference voltage Vr1 inputted to the inverting input terminal thereof and the voltage inputted to the inverting input terminal of the second comparator COMP2 becomes higher than the second reference voltage Vr2 inputted to the non-inverting input terminal thereof. As a result, the output of the small object sensing circuit 8 is changed from the high level to the low level. The resultant low signal from the small object sensing circuit 8 is applied to the pulse generator 9. Then, the output of the pulse generator 9 goes from the high level to the low level as shown in FIG. 4G upon detecting two rising edges of the signal as shown in FIG. 4I obtained by frequency-dividing the output signal from the clock generator 11 by 2. This low output of the pulse generator 9 releases the system from the reset state.

As apparent from the above description, according to the present invention, the presence of the small object in the cooking container is rapidly sensed and the system is thus reset. Therefore, the power consumption can significantly be reduced. Also, the system is rapidly restored to the normal state after the removal of the small object.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for sensing a small object in a high-frequency induction heating cooker, comprising:

rectifying/smoothing means for rectifying and smoothing an AC voltage from a power source to convert it into a DC voltage;

inverter means for converting the DC voltage from said rectifying/smoothing means into a high frequency of AC voltage;

heating means for generating an induced current according to the AC voltage from said inverter means to heat a target object in a cooking container;

synchronization detection means for detecting a synchronization signal resulting from a resonance operation of said inverter means;

current detection means for detecting an amount of current flowing through said rectifying/smoothing means and outputting a voltage based on the detected current amount;

voltage detection means for detecting a voltage from a desired position of said inverter means;

small object sensing means for discriminating presence of the small object in the cooking container in response to output voltages from said current detection means and said voltage detection means;

clock generation means for generating a clock signal for system synchronization;

pulse generation means for generating a pulse signal in response to output signals from said clock generation means and said small object sensing means;

reset means for outputting a reset signal to reset the operation of the high-frequency induction heating cooker;

a NOR gate for NORing the pulse signal from said pulse generation means and the reset signal from said reset means; and control means for controlling said inverter means in response to the synchronization signal from said synchronization detection means and an output signal from said NOR gate.

2. An apparatus for sensing a small object in a high-frequency induction heating cooker, as set forth in claim 1, further comprising:

an AND gate for ANDing the output signals from said clock generation means and said small object sensing means; and a buzzer being driven in response to an output signal from said AND gate.

3. An apparatus for sensing a small object in a high-frequency induction heating cooker, as set forth in claim 1, wherein said small object sensing means includes:

a first comparator having a non-inverting input terminal for inputting the output voltage from said voltage detection means and an inverting input terminal for-inputting a first reference voltage;

a second comparator having an inverting input terminal for inputting the output voltage from said current detection means and a non-inverting input terminal for inputting a second reference voltage; and an AND gate for ANDing output signals from said first and second comparators and outputting the resultant signal to said pulse generator.

* * * * *